W. F. MYLCHREEST.
HORSE CLEANER.
APPLICATION FILED FEB. 15, 1908.
921,143.
Patented May 11, 1909.
2 SHEETS—SHEET 2.
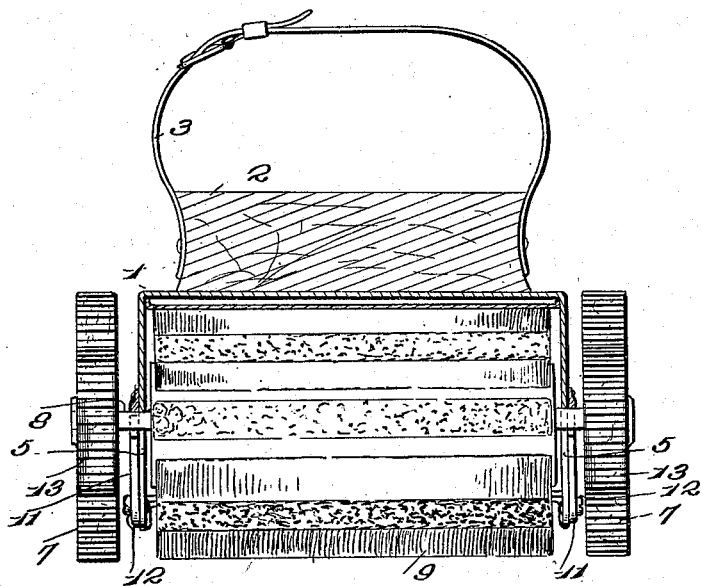
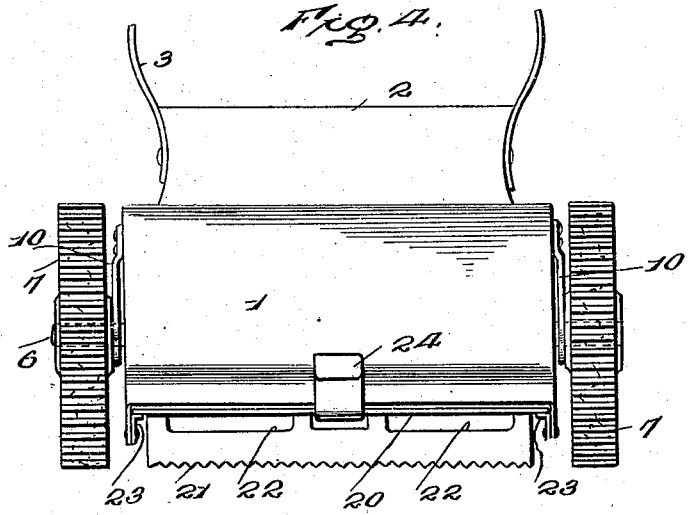

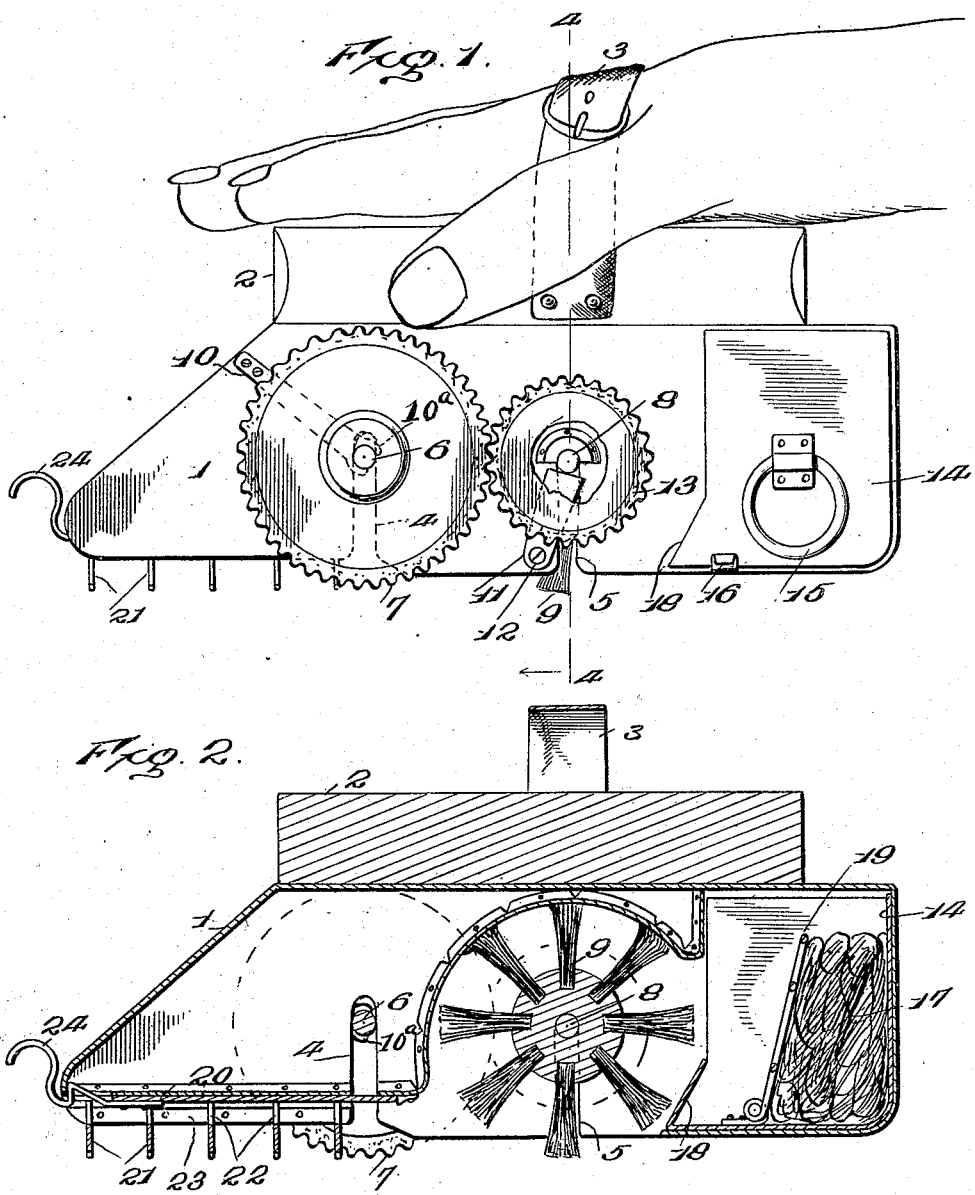

UNITED STATES PATENT OFFICE.

WILLIAM F. MYLCHREEST, OF OSWEGO, NEW YORK.

HORSE-CLEANER.

No. 921,143.   Specification of Letters Patent.   Patented May 11, 1909.

Application filed February 15, 1908. Serial No. 416,113.

*To all whom it may concern:*

Be it known that I, WILLIAM F. MYLCHREEST, citizen of the United States, residing at Oswego, in the county of Oswego and State of New York, have invented certain new and useful Improvements in Horse-Cleaners, of which the following is a specification.

The present invention relates to an improved device for cleaning animals such as horses and the like, and has for its object to provide a device of this character embodying novel means for collecting the dirt, thereby preventing the same from settling either upon the horse or upon the operator.

Broadly speaking the device comprises a frame having both a curry comb and brush mounted thereon, a novel mechanism being provided for operating the brush and a receptacle being provided for receiving and collecting the dirt loosened by the brush.

For a full description of the invention and the merits thereof and also to acquire a knoweldge of the details of construction and the means for effecting the result, reference is to be had to the following description and accompanying drawings, in which:

Figure 1 is a side elevation of a cleaning device embodying the invention. Fig. 2 is a longitudinal sectional view through the same. Fig. 3 is a transverse sectional view on the line 4—4 of Fig. 1. Fig. 4 is a front elevation of the cleaning device.

Corresponding and like parts are referred to in the following description and indicated in all the views of the drawings by the same reference characters.

Referring to the drawings the numeral 1 designates the supporting frame or casing which may be formed of sheet metal or other suitable material and upon which the curry comb and brush are mounted. Applied to the upper portion of the casing or frame is a block 2 having a hand receiving loop 3 connected thereto, the said block and loop enabling a secure grip to be obtained upon the device when applying the same to a horse or other animal. Each side of the casing 1 is provided with a pair of upwardly extending slots 4 and 5, the forward slots 4 receiving the shaft 6 upon which the brush actuating wheels 7 are mounted, while the rear slots 5 receive the shaft 8 carrying the rotary brush 9. The wheels 7 are so mounted as to have a yielding engagement with the animal during the operation of the cleaner, thereby insuring that the wheels be turned in the usual manner and operate the brush. The shaft 6 moves freely within the slots 4 and is received at each end thereof within the bifurcated extremity $10^a$ of a spring arm 10. These springs 10 perform the double function of holding the shaft 6 against accidental displacement and also of forcing the wheels 7 outwardly so that they will project beyond the casing and be held in a yielding engagement with the animal during the operation of the cleaner. It will be readily apparent however that by bending the springs 10 downwardly the shaft 6 can be either removed from position within the slots 4 or placed in position therein. In a somewhat similar manner the shaft 8 upon which the rotary brush is mounted is received within the rear slots 5 and is held against displacement by means of the swinging plates 11 which are designed to be locked in position by any suitable means such as the set screws 12. Any suitable means may be utilized for transmitting motion from the wheels 7 to the brush, and in the present instance the opposite extremities of the brush shaft 8 project beyond the sides of the casing and are provided with the wheels 13 engaging the corresponding wheels 7. As shown on the drawings the wheels 7 and 13 are provided with transversely corrugated tires, although this is by no means essential and may be entirely dispensed with if found desirable.

A dirt collecting receptacle 14 is removably mounted in the rear portion of the casing 1 and is designed to receive the dust loosened by the rotary brush 9. This receptacle is removable through one side of the casing, being provided at one end with a ring or finger-piece 15 and being normally held in position by means of a spring catch 16. Located within the receptacle is a sponge 17 which may be moistened to collect the finer particles of dust, the said sponge being normally forced against the rear side of the receptacle by a spring 19. The top and forward side of the receptacle are open to admit of the ready removal of the dirt and sponge therefrom, an inclined strip 18 being located at the lower portion of the front of the receptacle to prevent accidental spilling of the dirt therefrom.

The invention further contemplates a curry comb carried by the supporting frame or casing 1 for coöperation with the brush to thoroughly clean the animal. This curry comb is removable and comprises a base plate 20 carrying a plurality of transversely disposed toothed strips 21, the upper portions of the strips having openings 22 therein to admit of the dirt passing from the curry comb to the brush. The edges of the base plate 20 are received within guides 23 upon the sides of the casing 1 and the curry comb is locked against accidental displacement by means of a spring catch 24 engaging the casing. It will thus be apparent that as the cleaning device is applied to the animal, the curry comb will operate in the usual manner and the dirt loosened thereby will pass rearwardly through the openings 22 in the toothed strips to the brush 9. This brush will receive motion from the wheels 7 and the bristles thereof will serve to thoroughly clean the horse and to convey the dirt rearwardly where it is received and collected within the receptacle 14. At this point it is desired to again call attention to the fact that the springs 10 operate to force the wheels 7 downwardly below the casing 1 and to hold the same in a yielding engagement with the animal, thereby insuring rotation of the wheels without the necessity of forcing the device unduly against the animal and causing the teeth of the curry comb to injure it. When the receptacle 14 has been filled with dirt, the said receptacle can be readily removed through one side of the casing by loosening the catch 16 and the sponge 17 removed from or placed in position therein as required.

Having thus described the invention, what is claimed as new is:

1. In a device of the character described, the combination of a frame formed with spaced sides provided with slots which extend inwardly from the edges thereof, a shaft loosely received within the slots and removable through the open ends thereof, spring strips secured to the sides, the free ends of the spring strips being bifurcated to receive the shaft to prevent accidental displacement thereof and to hold it yieldingly in position within the slots, wheels upon the shaft, and a rotary brush mounted upon the frame to receive motion from the shaft.

2. In a device of the character described, the combination of a frame formed with spaced sides which are provided with guides, a curry comb slidably mounted within the guides, means for holding the curry comb in position, and a brush mounted upon the frame in coöperative relation to the curry comb.

3. In a device of the character described, the combination of a frame provided with a slot, a shaft received within the slot, a swinging plate for holding the shaft within the slot, a rotary brush upon the shaft, and means for imparting motion to the shaft.

4. In a device of the character described, the combination of a frame provided with a pair of slots upon each side thereof, a shaft movable within one set of the slots, springs holding the shaft yieldingly in position within the slots, wheels rigid with the shaft, a second shaft received within the opposite set of slots, swinging plates for holding the second shaft in position, a rotary brush mounted upon the second shaft, and wheels rigid with the second shaft and engaging the wheels upon the first mentioned shaft.

In testimony whereof I affix my signature in presence of two witnesses.

WILLIAM F. MYLCHREEST. [L. S.]

Witnesses:
JOHN HOWELL,
ANDREW RYAN.